(12) United States Patent
Kranitzky et al.

(10) Patent No.: US 6,493,602 B1
(45) Date of Patent: Dec. 10, 2002

(54) METHOD OF NON-LINEAR ROUTE DISPLAY

(75) Inventors: Walter Kranitzky, Traunstein (DE); Anton Brader, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/310,267

(22) Filed: May 12, 1999

(30) Foreign Application Priority Data

May 14, 1998 (DE) .......................................... 198 21 557

(51) Int. Cl.[7] .............................................. G06F 19/00
(52) U.S. Cl. .......................... 700/180; 700/159; 700/83
(58) Field of Search .................................. 700/159, 160, 700/170, 174, 173, 180, 184, 17, 83, 182; 345/619, 440.1

(56) References Cited

U.S. PATENT DOCUMENTS

| | | | |
|---|---|---|---|
| 4,788,481 A | * 11/1988 | Niwa ........................... | 318/565 |
| 4,922,440 A | * 5/1990 | Kawamura et al. ......... | 700/180 |
| 5,315,523 A | 5/1994 | Fujita et al. ................. | 700/180 |
| 5,471,394 A | * 11/1995 | Matsumura et al. ........ | 700/180 |
| 5,532,933 A | * 7/1996 | Nakata ........................ | 700/182 |
| 6,073,058 A | * 6/2000 | Cossen et al. .............. | 700/182 |
| 6,266,570 B1 | * 7/2001 | Hocherl et al. ............. | 700/170 |

\* cited by examiner

Primary Examiner—Leo Picard
Assistant Examiner—Kidest Bahta
(74) Attorney, Agent, or Firm—Sidley Austin Brown & Wood, LLP

(57) ABSTRACT

A method of non-linear display of routes of a machine-tool or another mechanism and including determining a set path based on stored commands and determining an actual path based on actual displacements during operation of the machine-tool or another mechanism resulting from execution of the stored commands, graphically displaying the set path and components of the actual path, which extend parallel to the set path, at a first scale, graphically displaying components of the actual path, which extend perpendicular to the set path, at a second scale, and graphically displaying at a selected points of the set path, the set path and the components of the actual path, which extend parallel to the set path, at a third scale and the components of the actual path, which extend perpendicular to the set path, at a fourth scale.

10 Claims, 2 Drawing Sheets

METHOD OF NON-LINEAR ROUTE DISPLAY

BACKGROUND OF THE INVENTION

1. Field of the Invention

The present invention relates to a method of non-linear display of routes of at least one of a machine-tool and another mechanism and which includes determining a set path based on stored commands and determining an actual path based on actual displacements during operation of the at least one of a machine-tool and another mechanism resulting from execution of the stored commands, graphically displaying the set path and components of the actual path, which extend parallel to the set path, at a first scale, and graphically displaying components of the actual path, which extend perpendicular to the set path, at a second scale.

2. Description of the Prior Art

Japanese Publication JP-A-07072914 discloses a method of displaying a return route of a tool with which a workpiece is machined. In order for the operator to be able to simultaneously recognize the displacement speed, the type, color and width of the line, which represents the route, change dependent on the displacement speed. At the points of the route, at which the tool speed is above or below a predetermined value, an attention mark is displayed.

The method of the Japanese Publication JP-A-07072914 does not provide for display of deviations of the actual path from the set path.

Japanese Publication JP-A-58-158713 discloses a method of automatic calculation of a scale and of a position of a tool and a workpiece profile and displaying the information on a display device associated with a numerically controlled machining equipment. The processing information, which is displayed by the display device, occupies the entire available display surface of the display device. The processing information can include a tool route and the machined profile of a workpiece.

However, the display does not permit the operator to compare the tool route with the machined profile of the workpiece. Therefore, the deviations of one line from another are not readily recognizable.

U.S. Pat. No. 5,315,523 discloses a display device of a numerical control unit which displays both the workpiece and the tool. In order to insure an optimal use of the display surface of the display device at all times, a new scale is calculated each time the distance between the tool and the workpiece changes. Thereby, it is insured that both the tool and the workpiece are always shown at a scale which permits to recognize the most possible number of different details.

However, the display of set and actual paths is not contemplated. A further drawback of this display device consists in that at a large distance between the tool and the workpiece, the workpiece in particular is displayed as a very small element. Therefore, an immediate recognition of an erroneous route is not possible.

European Publication EP 510 204 A1 discloses a method of determining the accuracy of a numerically controlled machining equipment. First, a numerical control command is fed to a control of a machine-tool. After execution of the command, the tool route is fed from the machine-tool to the control unit, and the deviation of the actual tool route from that prescribed by the control command is determined. In this way, the accuracy of the machining equipment is determined. Both the set path, which is determined by the control command, and the actual path, which is fed to the control unit, are graphically displayed on the display device. The operator has a possibility to determine the display scales in the X- and Y-direction dependent on the displayed deviations of one path from another.

The drawback of the method, which is disclosed in this European Publication, consists in that the scale can only be changed for the entire display device and not for selected regions of the graphical display. Thus, a selection of an enlargement, which permits to recognize the deviations between the set and actual paths, would not permit a complete display of the entire workpiece.

International Application W094/07187 discloses a method of testing the machining accuracy of a numerically controlled (NC) machine. The NC-machine has at least two axes each having its own drive which is controlled by a servo control loop. The NC-machine further includes a linear encoder for each axis. In accordance with the method, a circular set path is produced by the NC-machine, and a circular actual path, which is obtained based on the NC-machine movement, is compared with the circular set path. For comparison by the operator, both the set path and the actual path are graphically displayed.

One of the drawbacks of this method consists in that, the deviations of the circular actual path from the circular set path are so small at the contemporary NC-machines that the deviations cannot be recognized when the entire circles are displayed by the display device. With an enlarged display of only one section of the circle, the operator cannot see at which point of the circular path the largest error is observed. Further, with a complicated route, a circle does not permit the operator to clearly recognize which portion of the route is straight.

International application WO 97/27521 discloses a method of determining and optimizing the machining accuracy of a machine-tool or a robot. A course of a set path, which is determined by a sub-program available in the numerical control, is compared with an actual path. For determining the actual path, position measuring systems, which are available in a machine-tool for at least two axes, are used. for displaying the profile deviation, the geometrical relationship between the set and actual path is evaluated. The difference between the set point vector and the associated actual point vector is displayed in a direction perpendicular to the course of the set path.

The drawback of the method disclosed in this international application consists in that the entire route cannot be shown when the sectional enlargement takes place in order to make the deviations of the actual path from the set path more recognizable. The display of the entire workpiece is, thus, not possible.

Accordingly, an object of the present invention is to provide a method with which both the entire route display on the available display surface is possible, and the deviations of the actual path from the set path can be qualitatively assessed by the operator.

SUMMARY OF THE INVENTION

This and other objects of the present invention, which will become apparent hereinafter, are achieved by providing a method in which at a selected points of the set path, the set path and the components of the actual path, which extend parallel to the set path, are displayed at a third scale, and at the selected points of the set path, the components of the actual path, which extend perpendicular to the set path, are graphically displayed at a fourth scale.

The advantage of the method according to the present invention consists in that the sections of the route, in which no large deviation of the actual path from the set path is expected or takes place, are shown at a reduced scale, and the sections of the route, in which large deviations of the actual path from the set path are expected or take place, are shown at an increased scale. By selecting different scales for a single display, the sections of the route, which are of most interest to the operator, are displayed in detail, without a loss of the possibility of displaying the entire route.

The present invention, thus, provides for a user-friendly display of the set and actual paths. Because the operator can rapidly recognize the deviations, a possibility is created for displaying the entire route in a window of the display device, in addition to the enlarged display of the important sections of the route. Despite the display of the entire route, even small deviations of the actual path from the set path can be shown in detail. This is achieved by changing the scale at critical points such as, e.g., at corners of the set path or at points where a large deviation of the actual path from the set path takes place. Changing of the scale, as discussed above, permits to show the relevant sections of the set and actual path at an increased scale.

In addition, the displacement speed can be displayed in such a manner that the line representing the set displacement speed coincides with the set path, and the actual displacement speed is either determined in absolute terms and is superimposed onto the set displacement speed or is determined as a percentage of the set displacement speed likewise superimposed onto the set displacement speed. This makes immediately clear at which point of the set path the deviation of the speed from the set value takes place.

BRIEF DESCRIPTION OF THE DRAWINGS

The features and objects of the present invention will become more apparent, and the invention itself will be the best understood from the following detailed description for the preferred embodiments when read with references to the accompanying drawings, wherein.

DETAILED DESCRIPTION OF THE PREFERRED EMBODIMENT

Figure 1:
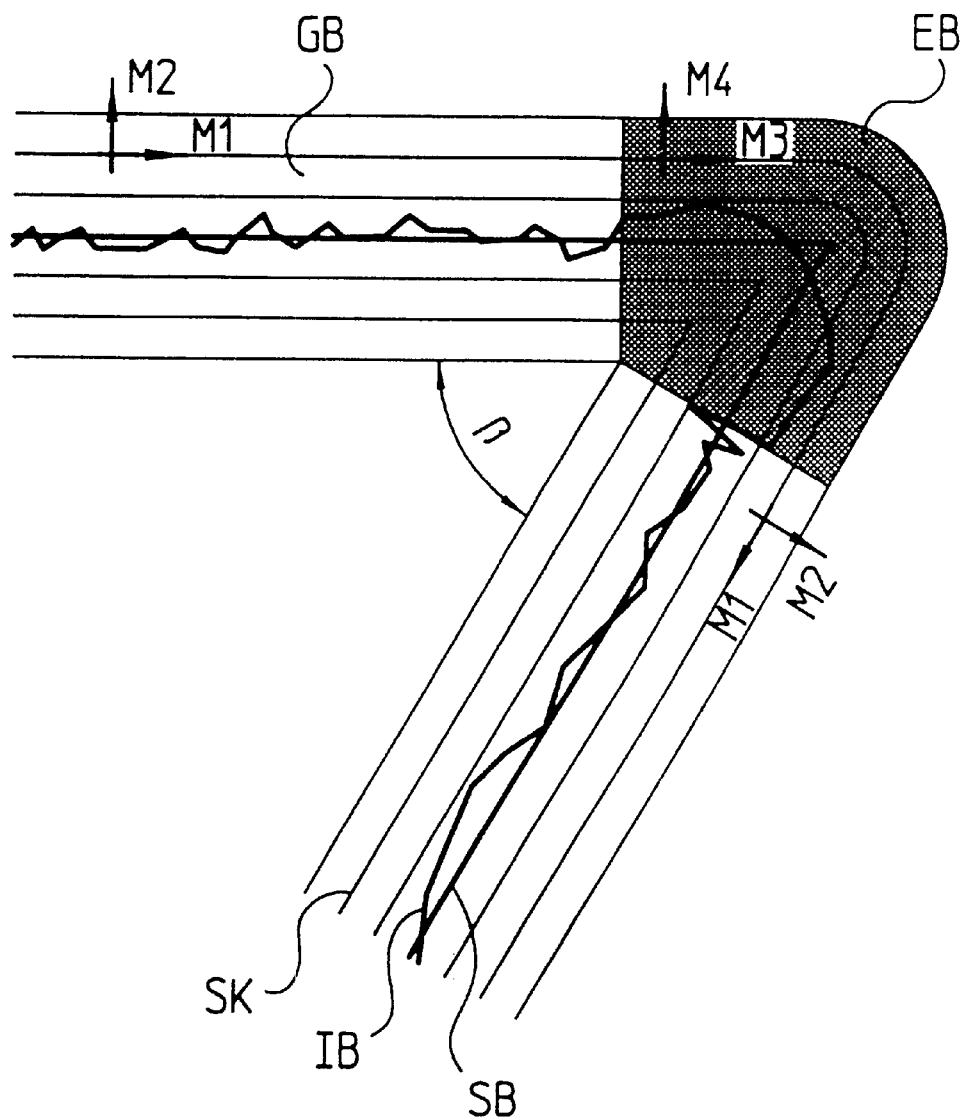
FIG. 1 shows a display according to the present invention of a possible course of a set path and an actual path.

FIG. 1 shows a possible graphic representation according to the present invention of a course of a set path SB and an actual path IB of a tool. Generally, the set path SB is shown as a straight line with a corner and from which the actual path IB deviates to a greater or lesser degree.

In the region of a rectilinear course GB of the set path SB, a scale M1, with which the set path SB and components of the actual path IB, which extend parallel to the rectilinear course GB, are shown, differs from a scale M2, with which the deviation between the actual path IB and the set path SB is shown. This difference consists in that the deviations of the actual path IB from the set path SB are shown at an increased scale. This difference is achieved by making the scale M2, with which the deviation of the actual path IB from the set path SB is shown, larger than scale M1. By selecting a larger scale M2, it became possible to make even small deviations of the actual path from the set path visible to an operator, without a noticeable enlargement of the entire graphic representation.

Additionally, parallel to the set path SB, a graduation SK is provided. The graduation SK permits the operator to make a qualitative assessment of the difference between the set path SB and the actual path IB. Separate graduation marks of the graduation SK are shown with a reduce line width, so that the set path SB and the actual path IB are emphasized, and the operator can unambiguously distinguish the set and actual paths SB and IB from the graduation SK.

Further, the set path SB about a corner EB is highlighted. The set path SB about the corner EB is highlighted by selecting a different scale M3 with which the set path SB and components of the actual path IB, which extend parallel to the set path SB, are shown in this region. The components of the actual path, which extend perpendicular to the set path SB, are shown, in the region of the set path IB around the corner EB, with a different scale M4. The different scale M4 for the perpendicular components of the actual path JB is selected because usually greater deviations of the actual path JB from the set path SB are observed in the corner region of the set path SB.

Advantageously, however, the scale M3, with which the set path SB and the components of the actual path IB, which extend parallel to the set path SB, are shown in the region of the corner, is selected to be the same as the scale M4 with which the deviations of the actual path IB from the set path SB are shown. In this case, both the set path SB and the actual path IB are shown in the region of the corner EB at the same scale. This simplifies reading of the display by the operator.

In order to prevent distortions at the borders between the rectilinear region GB and the regions around the corner EB, an auxiliary point for the actual path is determined when a point of the actual path IB lies in the rectilinear region GB and the following point of the actual path IB lies in the corner region EB or vice versa. The graphic representation of a portion of the actual path IB in the rectilinear region GB up to the auxiliary point is effected with the scales M1 and M2, and the graphic representation of a portion of the actual path IB in the corner region EB is effected with the scales M3 and M4.

To further facilitate reading by the operator, the scale M3, which is equal to the scale M4, for the corner region EB can also be used as the scale M2 for the deviation of the actual path IB from the set path SB in the rectilinear region GB. In this case, for M1≠M2=M3=M4, the set path SB and the components of the actual path IB, which extend parallel to the set path SB, which both do not lie in the corner region EB, are shown with the different scale M1. To the operator, this appears as shortening of the rectilinear region GB.

The graphic representation of the entire set path SB and the actual path IB takes place in a window which is determined by the operator, in particular with respect to its size. In order to optimally fill this window, the width of the window in a first direction is set at a certain ratio to the graphic representation in the first direction, and the width of the window in a second direction, perpendicular to the first direction, is likewise set at a certain ratio to the graphic representation in the second direction. In order to scale the graphic representation of the set path SB and the actual path IB in both directions in accordance with the window size, the ratios are so selected that the graphic representation is reduced. Thereby, it is insured that the graphic representation of the entire set path SB and the entire actual path IB can be displayed in the window.

During the execution of the process according to the present invention, the operator should input different data.

Thus, a number and a width of a graduation mark of the graduation SK, e.g., a width of 5 µm, should be input for the graduation SK which extends parallel to the set path SB. Then, the operator should input a desired set path-error envelope ratio which defines a ratio of the maximal extension of the set path to an entire width of all graduation marks of the graduation SK which form the error envelope around the set path. Thereafter, the operator should input the size of the region around the corner EB which should be shown with different scales M3 and M4. At this point, a standardized input can be made, with the operator inputting only a multiple of the width of the error envelope. At this, starting from the corner of the set path SB, parallel and antiparallel to the set path IB, in accordance with the input set path SB and actual path IB, e.g., a single width of the error envelope, a double width of the error envelope, etc. ... are shown with scales M3 and M4 along a predetermined length. Finally, the operator inputs the size of the window in which the set path SB and the actual path IB will be displayed.

Then, the set path SB and the actual path IB are determined. The set path SB is determined in accordance with numerical control commands stored in a memory.

The actual path IB is determined by execution of the stored commands by the numerical control for a machine tool and by measuring the resulting process displacements with available or additional measuring systems which are likewise controlled by the machine-tool numerical control. The measured values are used as an actual path IB. After the set path SB and the actual path IB have been stored in the memory, both maximal extensions of the set path SB are determined in both displayed dimensions.

Thereafter, the increase of the components of the actual path IB, which extend perpendicular or transverse to the set path SB, are calculated. In order to divide the actual path IB into components extending perpendicular or transverse to the set path SB and extending parallel to the set path SB, at points of the actual path IB, which are determined by the measuring system, aperpendicular to the set path SB is defined. The perpendicular represents a perpendicular deviation between the points of the set path SB and the actual path IB, and it is increased for graphical representation. For the calculation of the increase of the actual path component in a direction perpendicular to the set path SB, an available maximal extension of the set path SB in a first, X-direction or in a second, Y-direction perpendicular to the first, X-direction, is divided by the set path-error envelope ratio the number of the graduation marks of the graduation SK, and by the width between two graduation marks.

Alternatively, the increase of the actual path components, which extend transverse to the set path SB, can be input directly by the operator, without effecting any calculations.

This increase defines the scale M2 for the components of the set path IB, which extend perpendicular to the set path SB in the rectilinear region GB, and defines the scales M3 and M4 for the set path SB and the actual path IB in the corner EB.

Thereafter, the total extension of the entire graphical display is determined, taking into consideration the regions displayed at a larger scale at the corner EB, and the width of the error envelope. The total extension can be available in the first, X-direction or in the second, Y-direction which is perpendicular to the first, X-direction.

Finally, based on the dimensions of the window for graphical displacing of the set and actual path and on the determined total extension, the scale M1 for displacing of the set path SB and the components of the actual path IB, which extend parallel to the set SB, in the rectilinear region GB, is calculated. As a result, the total graphical display is adapted to the available display window.

Further, the operator can input a critical angle β. When the corner angle is smaller than the critical angle β, then in the region of the corner EB the difference scales M3 and M4 are not used. Rather, the region of the corner EB is displayed at the scales M1 and M2 used for the rectilinear region GB. This advantageous implementation is practically very important, because at a small critical angle β, a too large region of the corner EB is formed.

Additionally, there exists a possibility to graphically display the set and actual courses of the displacement speed of the drive in accordance with the set path SB in the same way as the set path SB and the actual path IB are displayed. To this end, the set displacement is displayed by a graphical course which is represented identically with the set path SB, and not absolutely. Additionally, taking into consideration the occurring deviations, the actual displacement is displayed. This is calculated by differentiation or by determination of derivatives of position values for the actual path IB which otherwise are not necessary.

According to an alternative embodiment of the present invention, the operator inputs the dimensions of the window for the graphical display of the set path SB and the actual path IB. Then, the operator input the increase for the deviations of the actual path IB from the set path SB in a form of 5 mm per 5 µm. This means that for the deviation of the actual path IB from the set path SB of 5 µm, the display will show 5 mm. That means that the scale M2=M3=M4=1000:1. This input also means that on the display unit, a graduation mark of the graduation SK should be shown at a distance of 5 mm from the set path SB. If the graduation mark, at the same scale, should be spaced from the set path SB only by 2 mm, the operator inputs 2 mm per 2 µm. The number of graduation marks is determined automatically, based on a to-be determined maximal deviation between the actual path IB and set path SB. Then, the operator inputs how large the region about the corner EB, which should be displayed at a different scale, should be.

Then, the set path SB and the actual path IB are determined. As it has already been discussed, the set path SB is determined based on the stored numerical control commands. The actual path IB is determined by measuring, with an available or additional measuring system, displacements effected by the machine-tool upon the execution of the appropriate command. Then, the deviations of the actual path IB from the set path SB and at least one maximum of these deviation of the actual path IB from the set path SB is used for the determination of the width of the error envelope and, thereby, for the determination of the scale for regions of the set path SB in the corner EB and of the components of the actual path IB which extend perpendicular to the set path SB. It is advantageous to use a double of the maximum deviation as a total width of the error envelope. Because the width of the graduation marks of the graduation SK is likewise input by the operator, thereby, simultaneously, the scale for the components of the actual path IB, which extend perpendicular to the set path SB, is also defined.

Finally, based on the dimensions of the window for both displayable dimensions, the scale M1 for the rectilinear region GB of the set path SB is calculated. The ratios Vx and Vy is calculated based on the difference between the window dimensions Xf, Yf minus the dimensions Xe, Ye associated with the corner region, and the dimensions Y2, Yg of rectilinear sections GB of the set path SB, for both dimensions.

$$Vx = \frac{Xf - Xe}{Xg} \quad \text{or} \quad Vy = \frac{Yf - Ye}{Yg}$$

The ratio, with which a smaller display is realized, will then be used as a scale for the rectilinear regions GB of the set path SB and for the components of the actual path IB, which extend parallel to the set path SB, in the both dimensions X and Y.

There may be a case that the operator input such small dimensions for the window, in which the set path SB and the actual path IB should be displayed, that the enlarged regions of these paths extend beyond the window area. This is the case when Vx and Vy are negative. In this case, an error message is output, with an indication that either the dimensions of the window should be enlarged or the enlarged displayed regions of the route locus must be reduced by the operator.

The advantage of this alternative embodiment consists in that the work to be performed by the operator is substantially reduced so that the possibilities of occurrence of errors is also substantially reduced. The scale M1 for the rectilinear regions GB of the set path SB is obtained by an automatic scale calculation which is based on the maximal deviation of the actual path IB from the set path SB and on the size of the regions of the corner EB. The calculated scale should insure the display in the window having predetermined dimensions.

In order to be able to allocate the points of the actual path IB to a correct section of the set path SB, allocation criteria are necessary. First of all, at points where the sections of the set path SB are separated by approximately a double or less of the maximum deviation of the actual path IB from the set path SB, an allocation criterium is necessary to determine which point of the actual path IB belongs to which section of the set path SB. The allocation criterium is represented by a distance of a point of the actual path IB from the set path SB. A point of the actual path IB is allocated to that section of the set path SB from which the point is spaced by the smallest distance.

Figure 2:
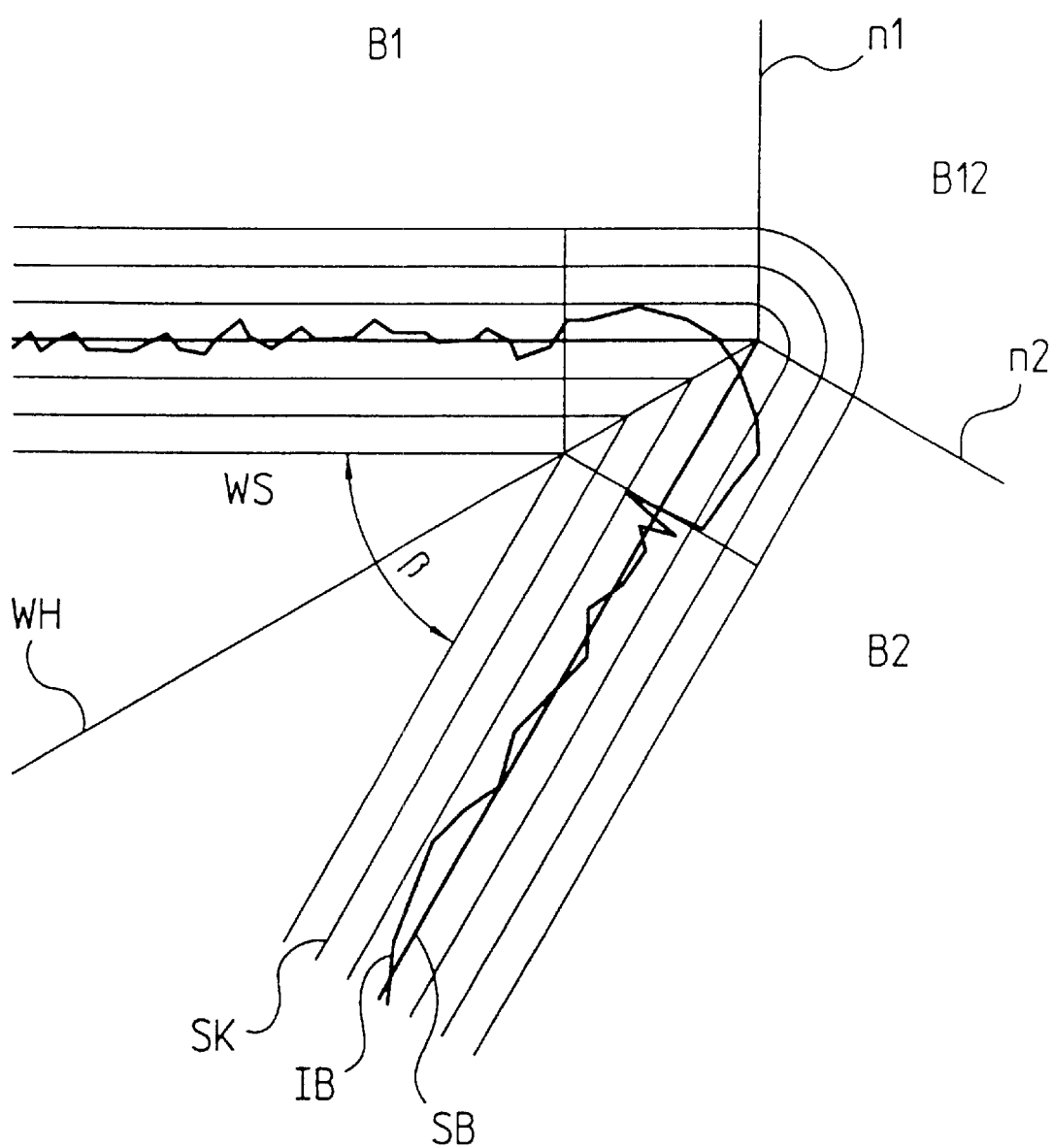
FIG. 2 shows a display according to the present invention of a possible deviation of set and actual paths in different segments.

This should be made clear on the course of the set path SB as shown in FIG. 2. Sections B1 and B2 of the set path SB form an angle β. In order to determine the allocation of path points, which are enclosed by the set path SB in the angular segment WS. The angle median line WH determines the angle β between the sections B1 and B2 of the set path SB. The median line WH divides the region between the Sections B1 and B2 of the set path SB in two parts, whereby the points of the actual path IB, which lie between the median line WH and the section B1 or B2 of the set path SB, are allocated to a respective adjacent section B1 or B2 of the set path SB.

When the points of the actual path IB do not lie in the small angular segment WS, which is defined by Sections Bi and B2 of the set path SB, at an intersection point B12, in which both sections B1 and B2 of the set path SB meet, two perpendiculars n1 and n2 are traced to the sections B1 and B2 of the set path SB. The two perpendiculars n1 and n2 define an angular region outside of the smaller angular segment WS. The points of the actual path IB, which lie between the perpendicular n1 and the section B1 of the set path SB are allocated to the section B1. The points of the actual path IB, which lie between both perpendiculars n1 and n2 in the angular region formed thereby, are allocated to the intersection point B12 of the Sections B1 and B2 of the set path SB. The points of the actual path IB, which lie between the perpendicular n2 and the section B2 of the set path SB, are allocated to the section B2. Even when the set path SB has a complicated course, the distance between the set path SB and the allocated point of the actual path IB defines the allocation criterium.

When on the border between the scale M1 and the scale M3, two points of the actual path IB adjacent to this border are not spaced from the set path SB by the same distance, or a point of the actual path IB does not lie completely on this border, the course of the actual path IB has a bend. This is based on the fact that at the reduced scale M1, the distance between the actual path IB and the set path SB changes more rapidly than at the scale M3 which reduces the graphic display at lesser degree. Therefore, for the calculation and the graphic display of the actual path IB, it is advantageous, as it has been mentioned previously, to provide an auxiliary point on the border between the two scales.

In accordance with a further embodiment of the present invention, the region of the corner EB of the set path SB is not shown as being entirely bigger than the rectilinear regions GB of the set path SB. Rather, only those regions of the corner EB are shown bigger in which a difference between the set path SB and the actual path IB, which exceeds a threshold value, exists. Thereby, only those regions are shown bigger in which obvious problems during machining operations exist, i.e., larger deviations of the actual path IB from the set path SB are observed.

According to a further embodiment of the present invention, the graduation marks of the graduation SK are spaced by the same distance from the set path SB at the ends of the set path SB and are connected by semi-circle. Thereby, the deviations at the start and finish points of the actual path IB are more visible to the operator.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A method of non-linear display of routes of at least one of a machine-tool and another mechanism, the method comprising the steps of:

determining a set path based on stored commands and determining an actual path based on actual displacements during operation of the at least one of a machine-tool and another mechanism resulting from execution of the stored commands;

graphically displaying the set path and components of the actual path, which extend parallel to the set path, at a first scale;

graphically displaying components of the actual path, which extend perpendicular to the set path, at a second scale different from the first scale;

graphically displaying, at selected points of the set path, the set path and the components of the actual path, which extend parallel to the set path, at a third scale; and graphically displaying, at the set path, the components of the actual path, which extend perpendicular to the set path, at a fourth scale.

2. A method as set forth in claim 1, where the third scale and the fourth scale are identical.

3. A method as set forth in claim 1, wherein the second scale and the third scale are identical.

4. A method as set forth in claim 1, wherein points of the set path at which at least one of the following takes place: the set path has a corner, a particularly large deviation between the set path and the actual path exists, and a new set of commands is processed, define the selected points.

5. A method as set forth in claim 1, further comprising the step of displaying a displacement speed, with the set path being used as an abscissa and a perpendicular to the set path being used as an ordinate for the displacement speed.

6. A method as set forth in claim 5, wherein the displacement speed displaying step comprises graphically displaying deviations of an actual displacement speed from a displacement speed defined by the stored command.

7. A method as set forth in claim 1, wherein points of the actual path are allocated to that section of the set path from which the points are spaced by a smallest distance.

8. A method as set forth in claim 1, further comprising the step of providing an auxiliary point at a border between two different scales when at this point the actual path has a bend resulting from a scale change.

9. A method as set forth in claim 1, comprising the step of providing and displaying a graduation, graduation marks of which are spaced from the set path by the same distance.

10. A method as set forth in claim 1, wherein points of the set path, which are displayed at the third and fourth scales, graphically differ from each other, respectively.

* * * * *